March 18, 1930.  O. K. KJOLSETH  1,751,336
RAILWAY TRUCK
Filed Dec. 19, 1928
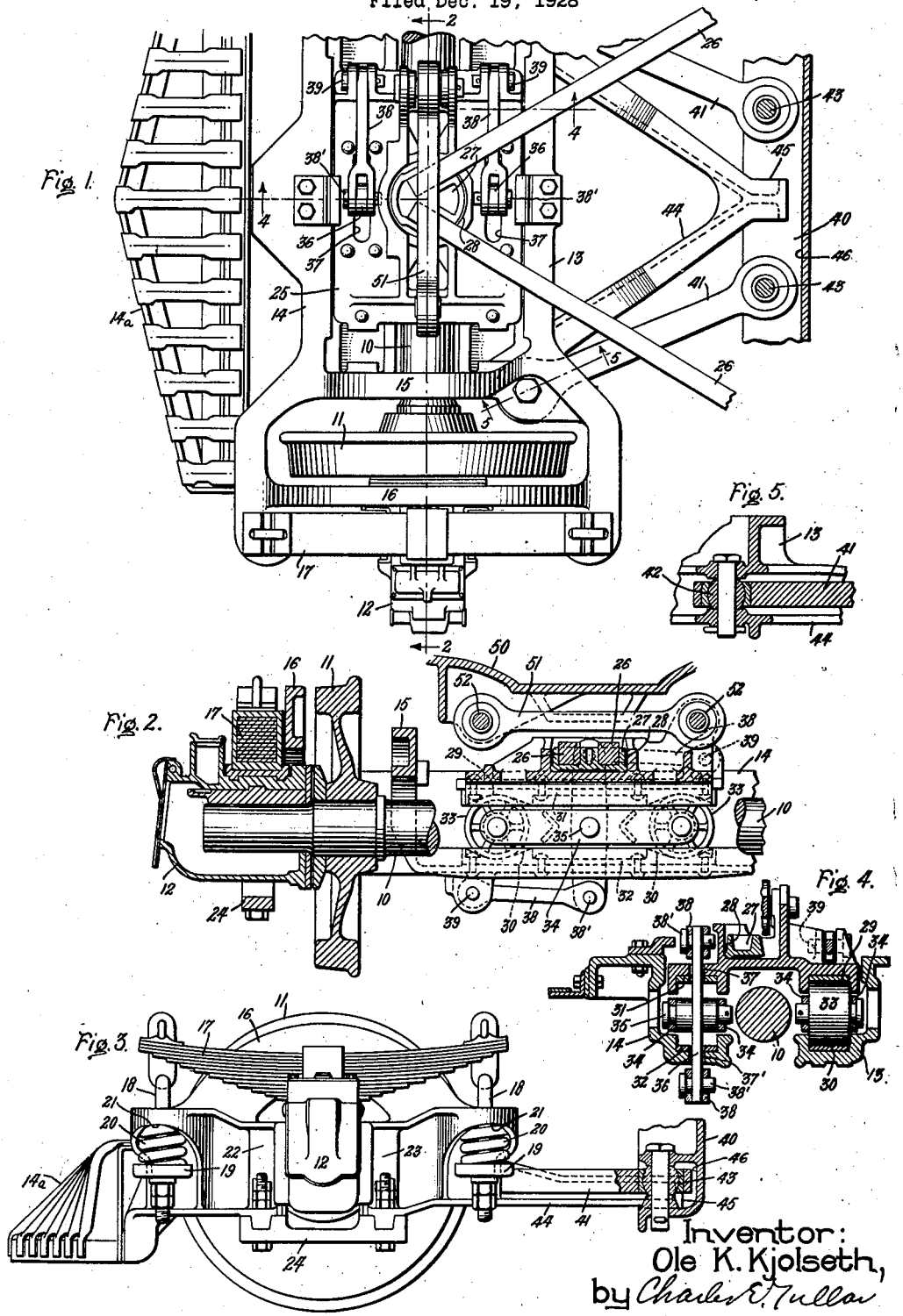
Inventor:
Ole K. Kjolseth,
by Charles E. Tullar
His Attorney.

Patented Mar. 18, 1930

1,751,336

UNITED STATES PATENT OFFICE

OLE K. KJOLSETH, OF SCOTIA, NEW YORK, ASSIGNOR TO GENERAL ELECTRIC COMPANY, A CORPORATION OF NEW YORK

RAILWAY TRUCK

Application filed December 19, 1928. Serial No. 327,094.

My invention relates to railway trucks.

An object of my invention is to provide an improved gravity centering mechanism associated with a locomotive or car, which is actuated by the weight supported on the truck to exert a force tending to resist lateral displacement of the truck with respect to the locomotive or car frame or the rigid truck thereof. This arrangement leads the rigid truck of the locomotive or car around a curve, thereby relieving flange pressures on the drivers, and also returns the truck to a definite position with respect to the locomotive or car whenever it is displaced therefrom due to swaying or "nosing" thereof. More particularly my improvement resides in providing a gravity centering mechanism, which is positively actuated, which maintains the parts in the desired relation, which is not subject to rapid wearing of the parts, and which can be easily and cheaply constructed.

Another object of my invention is to provide a gravity centering device of this character for a single axle truck which is arranged so that it does not interfere with ready removal of the axle from the truck frame.

A further object of my invention is to provide an arrangement for pivotally connecting the truck to the locomotive or car, which freely permits tilting of the truck transversely with respect to the car due to any irregularities in the track, but restricts tilting of the truck longitudinally of the car.

Further objects and advantages of my invention will become apparent as the following description proceeds, and the features of novelty which characterize my invention will be pointed out with particularity in the claims annexed to and forming a part of this specification :—

In the drawing Fig. 1 is fragmentary plan view of a single axle guiding truck embodying my invention; Fig. 2 is a section approximately on the line 2—2 of Fig. 1, the truck axle being shown in elevation and partly broken away to more clearly illustrate the construction; Fig. 3 is an end elevation of the structure shown in Fig. 1 partly broken away; Fig. 4 is a transverse section approximately on the line 4—4 of Fig. 1, and Fig. 5 is a section approximately on the line 5—5 of Fig. 1.

Referring to the drawing I have shown my invention in connection with a guiding truck having a single axle 10 provided with wheels 11 and outside journal boxes 12 on which the truck frame is supported. In order to provide for ready removal of the wheels and axle from the truck, the frame thereof is constructed of side portions 13 and 14 extending longitudinally of the axle 10 beyond the wheels and connected by integral portions 15 and 16 extending over the axle on opposite sides of the wheels, a pilot 14ª of the usual construction being secured to the side portion 14. The frame is spring-borne on the axle 10 by a leaf-spring 17 resting intermediate the ends thereof on the journal box and having the ends connected to the side portions 13 and 14 by links 18 having spring seats 19 secured thereon for retaining coil springs 20 between the spring seats and coil spring pockets 21 formed in the ends of the side portions 13 and 14. The ends of the side portions 13 and 14 are extended to form opposed guides 22 and 23 which slidably engage the journal box 12, the guides being connected at their lower ends by a tie bar 24 bolted thereto. It will be noted that in a truck of this construction that the wheels and axle 10 and 11 with the journal boxes 12 can be readily removed by suitably supporting the truck frame, removing the tie bars 24 at both ends, and dropping the wheels and axle below the truck frame. Although a portion of the guiding truck is broken away, this portion is of the same construction as that which is illustrated.

The truck is provided with a swinging bolster 25 on which a portion of the weight of the locomotive or car frame may be supported in any suitable manner. In this instance it is supported thereon by diagonal equalizers 26 resting on a bearing plate 27, which is rotatably seated in a cylindrical recess 28 formed in the bolster, to provide for pivotal movement of the truck relative to the car frame. The swinging bolster 25 is maintained substantially on the center line of the rigid truck frame 50 so as to permit turning movement of the bolster relative thereto, by a link 51 having a ball and socket connection with the bolster and rigid truck frame respectively at 52.

In accordance with my invention the weight of the locomotive or car, which is carried by the swinging bolster 25, is utilized to exert a force tending to resist lateral displacement of the truck and when displaced, to return the truck to a central position laterally with respect to the rigid truck frame, by means of my improved gravity centering mechanism. As shown in Fig. 2, this mechanism comprises a plurality of sloping surfaces 29 carried by the bolster 25 and a plurality of sloping surfaces 30 carried by the side portions 14 of the truck frame, and I prefer to form these surfaces on plates 31 and 32 which are riveted to the bolster and to the truck frame respectively. The mechanism also includes rollers 33 which are arranged between the co-operating surfaces 29 and 30. The surfaces and the rollers 33 may be varied in form to give the most desirable lateral restraining force. By this construction when the truck frame is displaced laterally on either side of its central position with respect to the car frame, shown in the drawing, the rollers 33 move over the sloping surfaces 29 and 30, so as to exert a force resisting the displacement of the truck. The resisting force reduces "nosing" or swaying of the locomotive or car, and decreases the wheel flange pressure exerted by the other trucks of the car in rounding a curve. In order to maintain the rollers 33 in the proper relation to the surfaces 29 and 30, when the truck frame is displaced laterally, so as to cause the bolster 25 to come to equilibrium in the center of the car frame, I connect the rollers 33 by tie bars 34 which are pivotally connected intermediate the ends thereof at 35 to a vertical link 36 extending through slots 37 and 37' formed in the bolster and the side portions 14 of the truck frame. The link 36 is connected to the side portion 14 of the truck frame and to the bolster 25 by links 38 which are pivotally connected at 38' to the link 36 and which are pivotally connected at 39 to the side portion 14 and to the bolster. In this construction it will be observed that when the truck frame is moved laterally in either direction from its position centrally of the rigid truck frame as shown in Fig. 2, the linkage including links 36, 38 and tie bars 34 will positively maintain the rollers 33 in the correct relation to the surfaces 29 and 30, which will cause the weight carried by the bolster 25 to resist lateral displacement, or when displaced, to return the truck to a central position with respect to the car frame.

In addition to the gravity centering mechanism which is arranged between the side portion 14 of the truck frame and the swinging bolster 25, I provide a gravity centering mechanism of the same construction between the side portion 13 of the truck frame and the bolster 25, which for convenience is designated by the same reference characters as the above described construction, the centering devices being arranged equidistant from the axle 10, as shown in Fig. 4, so as to symmetrically distribute the load on the truck frame, and to provide for ready removal of the wheels and axle therefrom.

It is desirable to connect the guiding truck of the locomotive or car thereto by an arrangement which turns the truck relative to the rigid truck frame upon displacement of the guiding truck laterally with respect thereto, so that the wheels will remain substantially tangent to the truck rounding a curve. The truck is, therefore, connected to a transverse member 40 of the rigid truck frame by two converging links 41. In order to prevent these links restricting tilting of the truck transversely with respect to the rigid truck frame, which would cause binding and excessive wear at the connections of the links 41, in accordance with my invention, I connect both ends of the links to the guiding frame at 42, as shown in Fig. 5, and to the transverse member 40 of the rigid truck frame at 43, as shown in Fig. 3, by ball and socket joints. It will be understood, however, that any other suitable form of links providing a universal joint connection may be employed for this purpose. In connecting the single axle guiding truck to the rigid truck of the locomotive or car by links of this kind tilting of the truck longitudinally of the rigid truck frame is not restricted. In order to prevent this tilting of the truck, which would cause binding and rapid wear of the bearing plate 27 in the recess 28, I provide a yoke 44 cast integrally with the side portion 13 of the truck frame, or any other suitable member rigidly secured to the truck frame, which has a bearing portion 45 extending into a channel 46 formed in the transverse member 40 of the rigid truck frame to which the links 41 are connected. By this arrangement the truck is free to tilt transversely with respect to the rigid truck in the event of any irregularity in the track, and the yoke 45 prevents tilting of the truck longitudinally of the locomotive or car.

My improved gravity centering device, and construction for connecting the guiding truck to the locomotive or car so as to turn the same upon lateral displacement of the truck with respect to the locomotive or car, are in this instance shown in connection with a guiding and a rigid truck of a locomotive or car, but it will be apparent that these devices may be employed in any other suitable relation to the structure of the locomotive or car.

Modifications of the form of my invention which I have described will occur to those skilled in the art, so that I desire my invention not to be limited to the particular arrangement set forth, and I intend in the appended claims to cover all modifications thereof which do not depart from the spirit and scope of my invention.

What I claim as new and desire to secure by Letters Patent of the United States, is:

1. In combination with a locomotive or car having a frame and a truck movable laterally with respect thereto, a gravity centering mechanism comprising a movable member for supporting the weight carried by said frame on said truck, and a linkage connected to said truck and said frame for moving said member upon displacement of said truck laterally in either direction from the center of said frame.

2. In combination with a locomotive or car having a frame and a truck movable laterally with respect thereto, a gravity centering mechanism comprising a plate having a sloping surface between said frame and said truck, a movable member engaging said surface for supporting the weight carried by said frame on said truck, and a linkage connected to said truck and said frame for moving said member relative to said sloping surface upon displacement of said truck laterally in either direction from the center of said frame.

3. In combination with a locomotive or car having a frame and a truck movable laterally with respect thereto, a gravity centering mechanism comprising means having a plurality of sloping surfaces between said frame and said truck, a plurality of interconnected movable members engaging said surfaces for supporting the weight carried by said frame on said truck, and a linkage connected to said truck and said frame for moving said members relative to said surfaces upon displacement of said truck laterally in either direction from the center of said frame.

4. In combination with a locomotive or car having a frame and a truck movable laterally with respect thereto, a gravity centering mechanism comprising a bolster, a plurality of interconnected rollers arranged between said bolster and said truck for supporting the weight carried by said bolster on said truck, and a linkage connected to said bolster and said truck for moving said rollers upon displacement of said truck laterally in either direction from the center of said frame.

5. In combination with a locomotive or car having a frame and a truck movable laterally with respect thereto, a gravity centering mechanism comprising a bolster, means including a plurality of sloping surfaces carried by said bolster and said truck arranged in cooperative relation to each other, a plurality of interconnected rollers each being arranged between pairs of said cooperating surfaces for supporting the weight carried by said bolster on said truck, and a linkage connecting said bolster and said truck to said rollers for moving them relative to said surfaces upon displacement of said truck laterally in either direction from the center of said frame.

6. In combination with a locomotive or car having a frame and a truck movable laterally with respect thereto, a bolster, a gravity centering mechanism including a plurality of sloping surfaces carried by said bolster and said truck, arranged in cooperative relation with each other, a plurality of rollers arranged between pairs of said cooperating surfaces for supporting the weight carried by said bolster on said truck, means for connecting said rollers together, and a linkage including a vertical link connected intermediate the ends thereof to said means connecting said rollers and having links connecting the opposite ends thereof to said truck and said bolster respectively for moving said rollers relative to said surfaces upon displacement of said truck laterally in either direction from the center of said frame.

7. In combination with a locomotive or car having a frame, a single axle truck movable laterally with respect to said frame, a bolster on said truck, a gravity centering mechanism for said truck including a plurality of sloping surfaces on said bolster and said truck and being arranged on opposite sides of said axle, the surfaces on said bolster being in cooperative relation with the surfaces on said truck, a plurality of interconnected rollers arranged between said cooperating surfaces on opposite sides of the axle, and a linkage connecting each of said interconnected rollers to said bolster and said truck for moving them relative to said surfaces upon displacement of said truck laterally in either direction from the center of said frame.

8. In combination with a locomotive or car having a frame, a single axle truck movable laterally with respect to said frame, said truck comprising a frame having portions on opposite sides of said axle, a bolster on said truck, and a gravity centering mechanism for supporting said bolster on said side portions including movable members arranged between them on opposite sides of said axle and a linkage connecting said members to said bolster and said truck frame so as to permit ready removal of said axle from said frame.

9. In combination with a locomotive or car having a frame, a single axle truck movable laterally with respect to said frame, said truck comprising a frame having portions on opposite sides of said axle, a bolster on said truck, and a gravity centering mechanism for supporting said bolster on said side portions including sloping surfaces on said bolster and said side portions having interconnected rollers arranged between them and a linkage connecting said interconnected rollers to said bolster and said truck frame so as to permit ready removal of said axle from said frame.

10. In combination with a locomotive or car having a frame, a single axle truck, means including two links each having a universal joint connection with said truck for movably connecting said truck to said frame, and means for preventing tilting of said truck longitudinally of said frame.

11. In combination with a locomotive or car having a frame, a single axle truck, means including two links each having a universal joint connection with said truck for movably connecting said truck to said frame, and means including a beam rigidly connected to said truck and slidably engaging a portion of said frame for preventing tilting of said truck longitudinally of said frame.

12. In combination with a locomotive or car having a frame, a single axle truck, said frame having a transverse member comprising a channel, means including two links each having a universal joint connection with said truck and said transverse member for movably connecting said truck to said frame, and means including a beam rigidly connected to said truck and slidably engaging said channel for preventing tilting of said truck longitudinally of said frame.

13. In combination with a locomotive or car having a frame, a single axle truck, means including two converging links each having a universal joint connection with said truck for movably connecting said truck to said frame so that the truck is turned relative to said frame upon lateral movement with respect thereto, and means for preventing tilting of said truck longitudinally of said frame.

14. In combination with a locomotive or car having a frame, a single axle truck, means including two converging links each having a universal joint connection with said truck for movably connecting said truck to said frame so that the truck is turned relative to said frame upon lateral movement with respect thereto, and means including a beam rigidly connected to said truck and slidably engaging a portion of said frame for preventing tilting of said truck longitudinally of said frame.

15. In combination with a locomotive or car having a frame, said frame having a transverse member comprising a channel, means including two links diverging from said member each having a universal joint connection with said truck and said member for movably connecting said truck to said frame so that the truck is turned relative to said frame upon lateral movement with respect thereto, and means including a beam rigidly connected to said truck and slidably engaging said channel for preventing tilting of said truck longitudinally of said frame.

In witness whereof, I have hereunto set my hand this 18th day of December, 1928.

OLE K. KJOLSETH.